US011337154B2

(12) United States Patent
Van Weeren

(10) Patent No.: US 11,337,154 B2
(45) Date of Patent: May 17, 2022

(54) RECEIVER FOR PROVIDING AN ACTIVATION SIGNAL TO A DEVICE

(71) Applicant: FNV IP B.V., Leidschendam (NL)

(72) Inventor: Dennis Van Weeren, Nieuw Vennep (NL)

(73) Assignee: FNV IP B.V.

( * ) Notice: Subject to any disclaimer, the term of this patent is extended or adjusted under 35 U.S.C. 154(b) by 0 days.

(21) Appl. No.: 17/262,309

(22) PCT Filed: Jul. 31, 2019

(86) PCT No.: PCT/NL2019/050508
§ 371 (c)(1),
(2) Date: Jan. 22, 2021

(87) PCT Pub. No.: WO2020/027660
PCT Pub. Date: Feb. 6, 2020

(65) Prior Publication Data
US 2021/0306950 A1    Sep. 30, 2021

(30) Foreign Application Priority Data

Aug. 1, 2018   (NL) ...................................... 2021416

(51) Int. Cl.
*H04W 52/02* (2009.01)
*H04B 10/112* (2013.01)
(Continued)

(52) U.S. Cl.
CPC .... *H04W 52/0235* (2013.01); *H04B 10/1123* (2013.01); *H04B 11/00* (2013.01); *H04B 13/02* (2013.01)

(58) Field of Classification Search
CPC ........... H04W 52/0235; H04B 10/1123; H04B 11/00; H04B 13/02
See application file for complete search history.

(56) References Cited

U.S. PATENT DOCUMENTS 3,725,660 A   4/1973 Doherty
5,591,962 A   1/1997 Koishi et al.
(Continued)

FOREIGN PATENT DOCUMENTS

EP   0271190 A2   6/1988
EP   2590332 A2   5/2013
WO   2020027660 A1   2/2020

OTHER PUBLICATIONS

International Search Report and Written Opinion; PCT Application No. PCT/NL2019/050508; dated Oct. 7, 2019.

*Primary Examiner* — Dominic E Rego

(74) *Attorney, Agent, or Firm* — Polsinelli PC

(57) ABSTRACT

A receiver (30) for providing an activation signal (54) to transition a device from a dormant state to an operative state. The receiver includes a sensor (32), a super regenerative oscillator, SRO, circuit (34), and a processing device (36, 38). The sensor is one of an optical sensor, an acoustic sensor, and a magnetic field sensor, and generates detector signals (40) based on wireless signals (28) received from an external source (18). The SRO circuit is electrically coupled to the sensor to receive the detector signals, and electrically oscillates with a constant SRO frequency and with a SRO amplitude (As) that changes when a carrier frequency of the detector signal substantially matches the SRO frequency. The processing device monitors the SRO amplitude in time, and generates the activation signal when a temporal characteristic (Sc) of the monitored SRO amplitude matches a predetermined reference pattern (52).

23 Claims, 5 Drawing Sheets

(51) Int. Cl.
  *H04B 11/00* (2006.01)
  *H04B 13/02* (2006.01)

(56) References Cited

U.S. PATENT DOCUMENTS

| | | | |
|---|---|---|---|
| 6,035,002 A | 3/2000 | Schleifer | |
| 7,010,076 B1* | 3/2006 | Donohue | H03L 7/14 |
| | | | 375/376 |
| 8,933,650 B2* | 1/2015 | O'Neal, III | H03L 7/00 |
| | | | 315/502 |
| 2007/0035517 A1* | 2/2007 | Chen | G06F 3/03543 |
| | | | 345/163 |
| 2008/0203309 A1 | 8/2008 | Frach et al. | |
| 2009/0039237 A1 | 2/2009 | Inoue et al. | |
| 2009/0140870 A1* | 6/2009 | Densham | H01M 10/4257 |
| | | | 340/636.15 |
| 2010/0214267 A1* | 8/2010 | Radivojevic | G06F 1/1632 |
| | | | 345/175 |
| 2010/0329363 A1 | 12/2010 | Ng et al. | |
| 2011/0140908 A1* | 6/2011 | Kosht | H04Q 9/00 |
| | | | 340/870.02 |
| 2012/0077538 A1* | 3/2012 | Yun | H04W 52/283 |
| | | | 455/522 |
| 2012/0269360 A1* | 10/2012 | Burke | E04H 3/14 |
| | | | 381/77 |
| 2013/0176467 A1* | 7/2013 | Lin | H04N 5/232933 |
| | | | 348/294 |
| 2015/0133148 A1* | 5/2015 | Yang | G06F 16/21 |
| | | | 455/456.1 |
| 2015/0358149 A1* | 12/2015 | Ito | H04L 27/0014 |
| | | | 375/360 |
| 2017/0070959 A1* | 3/2017 | Khazanov | H04W 52/0235 |
| 2017/0322562 A1* | 11/2017 | Churavy | H03M 13/156 |
| 2018/0172304 A1* | 6/2018 | Wolfson | F24F 11/0001 |
| 2019/0090189 A1* | 3/2019 | Story | H04W 76/28 |
| 2019/0104282 A1* | 4/2019 | Siu | H04N 5/2254 |
| 2020/0329363 A1 | 10/2020 | Mehta | |

* cited by examiner

RECEIVER FOR PROVIDING AN ACTIVATION SIGNAL TO A DEVICE

CROSS-REFERENCE TO RELATED APPLICATIONS

This application is a national stage application of International Application No. PCT/NL2019/050508, which was filed on Jul. 31, 2019, which claims priority to Netherlands Application Number 2021416 filed on Aug. 1, 2018, of which is incorporated by reference in its entirety.

TECHNICAL FIELD

The invention relates to a receiver for providing an activation signal to a device to transition the device into an operative state, and to a unit including such a receiver. Furthermore, the invention relates to a method for transitioning a unit into an operative state, and to a computer readable medium for carrying out the proposed method.

BACKGROUND ART

In power-constrained electronic devices such as wireless communication and/or sensing devices, energy efficiency is a critical design consideration. Such power-constrained devices may be battery operated, solar powered, restricted in waste heat discharging capability, or otherwise limited in their allowed power consumption. Power-constrained sensing or communication devices typically include a wireless transceiver that has significant power requirements. Such power-constrained system may nevertheless be required to function autonomously for a prolonged time (e.g. several months to years), to reduce deployment, maintenance, and retrieval operations to a minimum. As an example, deep-sea instruments may be deployable on the seafloor for sensing/monitoring operations. The hostile underwater conditions in deep-sea environments, with typical ocean floor depths in the order of several kilometers, severely hinder maintenance and retrieval operations.

Such and other power-constrained devices may benefit from an ability to toggle between an active mode ("operative state") in which the device is fully functional, and a standby mode ("dormant state") in which most sub-systems are switched off to reduce energy consumption when execution of sensing/communication functions is not desired. When the timing requirements for toggling between the states are known in advance, it may suffice to implement an internal mode-toggling scheme in the device's own controller. However, if the timing schedule or other conditions for toggling between states cannot be defined in advance, it may be beneficial to implement a wake-up signaling scheme that allows an external source to send a signal to the device and cause it to change state.

Correspondingly, it would be desirable to provide a wake-up receiver for transitioning a device from a dormant state to an operative state, which achieves a good balance between energy consumption, sensitivity, and selectivity.

SUMMARY OF INVENTION

Therefore, according to a first aspect of the invention, there is provided a receiver that is configured to provide an activation signal to a device in order to transition the device from a dormant state to an operative state. The receiver comprises a sensor, a super regenerative oscillator (SRO) circuit, and a processing device. The sensor is one of an optical sensor, an acoustic sensor, and a magnetic field sensor, and is configured to receive a wireless signal from an external source and to generate a detector signal in response to the received wireless signal. The SRO circuit is electrically coupled to the sensor to receive the detector signal, and configured to electrically oscillate with a constant SRO frequency and with a SRO amplitude that changes when a carrier frequency of the detector signal substantially matches the SRO frequency. The processing device is configured to monitor the SRO amplitude in time, and to generate the activation signal when a temporal characteristic of the monitored SRO amplitude matches a predetermined reference pattern.

The proposed receiver includes a low power circuit for sending an activation signal to the device. Said circuit may be designed as a wake-up circuit. The device remains in a dormant ("standby") state when the device is not required to operate, to minimize power consumption and conserve energy. The SRO-based receiver may be efficiently used in power-constrained systems.

The sensor may be an optical sensor (e.g. a photodiode or light dependent resistor), an acoustic sensor (e.g. a hydrophone), or a magnetic field sensor (e.g. a magnetometer). Correspondingly, the wireless signal may be a wireless optical signal, a wireless acoustic signal, or a wireless magnetic field signal. Such sensors and wireless signal carriers are particularly suitable in environments with ambient fluids that exhibit high absorption of radio-frequency electromagnetic waves, for instance in underwater settings. The term "wireless" is used herein to refer to the transfer of information between objects that are at different locations, and which are not interconnected by wires but exchange signals via waves emitted and/or received via the fluid medium or vacuum that surrounds these objects.

When the sensor receives a wireless signal from a source in the vicinity, it generates a detector signal, e.g. an electrical potential difference or electrical current. This detector signal varies in time in response to changes in the received signal amplitude, and is injected into the SRO circuit. The SRO circuit may additionally be driven by a periodic electric current or voltage that brings the SRO into and out of electrical oscillation. The SRO circuit can be made to oscillate at the SRO resonance frequency, and will predominantly respond to detector signals with carrier frequencies that are substantially equal to the SRO frequency. Here, i.e. in the specification and the claims, the term "substantially" refers to a situation where the carrier frequency is close to the SRO frequency, i.e. preferably within a range of ±10%, more preferably within arrange of ±5%, and most preferably within a range of ±1% of the SRO frequency. The term "carrier frequency" is used herein to refer to a fundamental harmonic amplitude variation in the disturbance of the carrying medium itself, e.g. periodic oscillation of the fluid particles in the case of sound, or low-frequency periodic oscillation of the magnetic field in non-radiative/inductive coupling, or an additional harmonic amplitude modulation with a lower frequency that is superposed onto the fundamental oscillation of the carrying medium, e.g. harmonic AM in the case of light. In order to successfully address the receiver, the external source should be able to generate a wireless signal with a carrier frequency falling within the SRO's peak resonance response, and to further modulate this carrier frequency signal with the predetermined reference pattern, e.g. based on amplitude-shift keying. When a wireless signal with a right carrier frequency and data signature is picked-up by the sensor, filtered by the SRO, and tracked in time and recognized by the processing device, the latter will generate a wake-up signal.

The SRO circuit functions as a frequency-selective filter, e.g. bandpass filter, which only generates a deviating amplitude response, i.e. different from default amplitude variation upon receiving detector signals with a carrier frequency that substantially matches with the SRO center frequency. Detection signals with carrier frequencies that are outside, i.e. higher or lower than the SRO's resonance peak cause no noticeable response. The SRO circuit is highly sensitive to signals with a matching carrier frequency, and generates a substantial SRO amplitude change even for detector signals with small amplitudes. The receiver therefore provides a large gain for received signals with a carrier frequency that matches the SRO frequency.

In an embodiment, the SRO circuit is configured to electrically oscillate with a varying SRO amplitude during successive time intervals. The SRO amplitude may be quenched at a start of each time interval and may subsequently rise during said time interval. A rising rate for the SRO amplitude within said time interval may be magnified when the carrier frequency of the detector signal substantially matches the SRO frequency. The processing device may then be configured to determine characteristic times for the rise of the SRO amplitude during each of the time intervals to derive the temporal characteristic.

A characteristic time required for the SRO amplitude to increase in a particular time interval from (virtually) zero to a reference amplitude will vary as function of detector signal amplitude. If the sensor is not receiving a wireless signal and not generating a detector signal (apart from noise), it takes the SRO a first characteristic time to bring the SRO oscillation amplitude to the reference level. If the sensor picks up a wireless signal with a carrier wave at or near the SRO center frequency, it takes the SRO a second characteristic time shorter than the first time to bring the oscillation amplitude up to the reference level. The SRO oscillation thus rises more rapidly when receiving a detector signal at/near the SRO frequency, with the rate of increase being dependent on the amplitude of the wireless signal. By measuring the characteristic time for each time interval, the amplitude modulation of received wireless signals with matching frequency may be transformed into a time-domain signal. The SRO oscillation may be impressed by an external periodic signal source that alternatingly drives and quenches the oscillations in the SRO circuit.

The SRO circuit may be configured to let the rate of increase of the oscillation amplitude vary in time as a logarithmic function of an amplitude of the detector signal. Letting the characteristic time Ti vary as a logarithmic function of the detector signal amplitude Ar—i.e. Ti$\propto$ log (k·Ar)—allows the SRO circuit to provide automatic gain control. Relatively small detector signal amplitudes (compared to no detector signal) already causes noticeable Ti-shortening, whereas further Ti-shortening for larger detector signals follows a logarithmic trend. In this manner, large detector signal amplitudes, e.g. from a source that is nearby and/or emits signals with a high spectral power at the SRO frequency, do not immediately drive the SRO into maximum oscillation.

In embodiments, the processing device comprises a comparator that is configured to receive an output signal with said varying SRO amplitude from the SRO circuit, and is configured to output a comparator signal with a distinct value if the varying SRO amplitude exceeds a reference amplitude.

In further embodiments, the receiver comprises a microcontroller that is electrically coupled to the comparator and configured to receive and store said comparator signal with a sequence of consecutive distinct values in time, to compare the sequence of consecutive distinct values to said predetermined reference pattern, and to generate the sequence of consecutive distinct values matches said predetermined reference pattern.

The varying characteristic startup times Ti for the SRO may be analyzed by the microcontroller, which scans for a potential presence of a predetermined pattern in the sequence of comparator signals by comparison with a reference pattern. The microcontroller may for instance be formed as a programmable system-on-chip (PSoC), and include a shift register for storing an updated sequence of consecutive comparator signals in time, including the most recent comparator signal and a predetermined integer number of preceding comparator signals. After each measurement and update, the microcontroller may compare the updated sequence with the reference sequence to determine if they match, and to generate the activation signal is this is the case.

In further embodiments, the microcontroller is electrically coupled to the SRO circuit, and configured to generate and impose onto the SRO circuit a driving signal that is superimposed upon the detector signal. The SRO may thus be controlled by a periodic driving signal that is generated by the same microcontroller that also measures the characteristic time delays Ti. This functional integration helps to reduce power consumption. The driving signal may form an alternatingly rising and falling signal that is configured to periodically induce and quench oscillations in the SRO circuit. The driving signal may for instance be a periodic quench-ramp signal with a sawtooth profile, which is alternatingly formed by slowly rising edges that incite SRO oscillations, and steeply falling edges that quench the SRO oscillations. Falling edges of the ramping signal may be regularly paced to mark each start of a time slot $\Delta$ti, and a characteristic time Ti between a falling edge of the driving signal and the next moment SRO oscillations start depends on the amplitude of the (frequency-matching) detector signal.

In alternative embodiments, the SRO circuit may be "self-quenching", which refers to an architecture in which the SRO circuit itself causes the oscillation to quench as soon as the oscillation amplitude has reached a threshold value.

According to an embodiment, the sensor is an optical sensor including a plurality of avalanche photodiode (APD) elements. The APD elements may be arranged in an array and form part of a silicon photomultiplier (SiPM) sensor. The considerable photon detection efficiency, high detection gain, and fast response time of a SiPM sensor render this sensor type particularly suitable for optical detection and wireless optical communication in environments with low levels of ambient light, for instance for light detection and/or communication between entities that are deployed in a subsea environment at distances of several, up to hundreds of meters.

In alternative embodiments, the optical sensor may include a plurality of light dependent resistor (LDR) elements.

According to embodiments, the SRO circuit comprises a frequency selective element and a gain element, which frequency selective element is tuned to said carrier frequency. In further embodiments, a gain of the gain element is controlled by said driving signal.

In embodiments, the SRO circuit is at least one of a Collpits oscillator, a Hartley oscillator, a Pierce oscillator, and a Clapp oscillator.

According to a second aspect, and in accordance with advantages and effects described herein above with reference to the first aspect, there is provided a unit that includes a receiver in accordance with the first aspect. The processing device is configured to generate an activation signal to transition the unit from a dormant state to an operative state.

In embodiments, the unit comprises at least one of a wireless communication device and an imaging device. The processing device may then be configured to generate the activation signal to transition the at least one of the wireless communication device and the imaging device from a dormant state to an operative state.

In a further embodiment, the wireless communication device includes a communication receiver that is electrically coupled to the sensor of the receiver. This communication receiver may be configured to receive and process further detector signals from the sensor when the communication device has transitioned into the operative state. The same sensor may thus be shared by the circuit and the communication receiver, which lowers the spatial footprint and number of components.

In further embodiments, the unit is configured to be deployed underwater on or in a submerged earth layer or a submerged structure. In this case, the imaging device may be an underwater photogrammetric camera that is configured to acquire image data of the surroundings of the unit. Alternatively or in addition, the communication receiver may be an optical receiver that is configured to receive wireless optical communication signals that approach the unit through the surrounding fluid medium.

In an alternative embodiment, the unit is configured to be deployed underwater on or in a submerged earth layer or a submerged structure, and the unit comprises an mechanical release that is configured to create a temporal connection for holding the unit at or near the earth layer or structure. In this case, the sensor may be an acoustic sensor coupled to the mechanical release. The receiver may then be configured to provide the activation signal to the mechanical release, in order to remove the temporal connection and allow the unit to ascent from the earth layer or structure.

According to a third aspect, and in accordance with advantages and effects described herein above with reference to the first aspect, there is provided a method for transitioning a unit from a dormant state to an operative state. The unit comprises a SRO circuit, a processing device, and a sensor that is one of an optical sensor, an acoustic sensor, and a magnetic field sensor. The method comprises:
  receiving, with the sensor, a wireless signal from an external source in the vicinity of the unit;
  generating, with the sensor, a detector signal in response to the received wireless signal;
  receiving, with the SRO circuit, the detector signal;
  causing the SRO circuit to electrically oscillate with a constant SRO frequency and with a SRO amplitude that changes when a carrier frequency of the detector signal substantially matches the SRO frequency;
  monitoring, with the processing device, the SRO amplitude in time;
  generating, with the processing device, an activation signal when a temporal characteristic of the monitored SRO amplitude matches with a predetermined reference pattern, and
  using the activation signal to transition the unit from the dormant state to the operative state.

In an embodiment, the method comprises:
  causing the SRO circuit to electrically oscillate with a varying SRO amplitude during successive time intervals, including quenching the SRO amplitude at a start of each time interval, followed by causing the SRO amplitude to rise during said time interval, wherein a rising rate for the SRO amplitude within said time interval is magnified when the carrier frequency of the detector signal substantially matches the SRO frequency, and
  determining, with the processing device, characteristic times for the rise of the SRO amplitude during each of the time intervals, to derive the temporal characteristic.

In a further embodiment, the method comprises:
  comparing the SRO amplitude with a reference amplitude, and generating a comparator signal with a distinct value if the SRO amplitude exceeds the reference amplitude.

In yet a further embodiment, the method comprises:
  receiving and storing a said comparator signal with a sequence of consecutive distinct values in time;
  comparing the sequence of consecutive distinct values to said predetermined reference pattern, and
  generating the activation signal when the sequence of consecutive distinct values matches said predetermined reference pattern.

In embodiments, the microcontroller is electrically coupled to the SRO circuit, and the method further comprises:
  generating, with the microcontroller, a driving signal, and imposing the driving signal together with the detector signal onto the SRO circuit.

In further embodiments, the driving signal is a periodically rising and falling signal, and the method further comprises:
  periodically quenching and inducing oscillations in the SRO circuit during each of successive time intervals.

Further aspects relate to a computer program product and a computer readable medium, which provide and store instructions for carrying out the method according to the third aspect.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Figure 1:
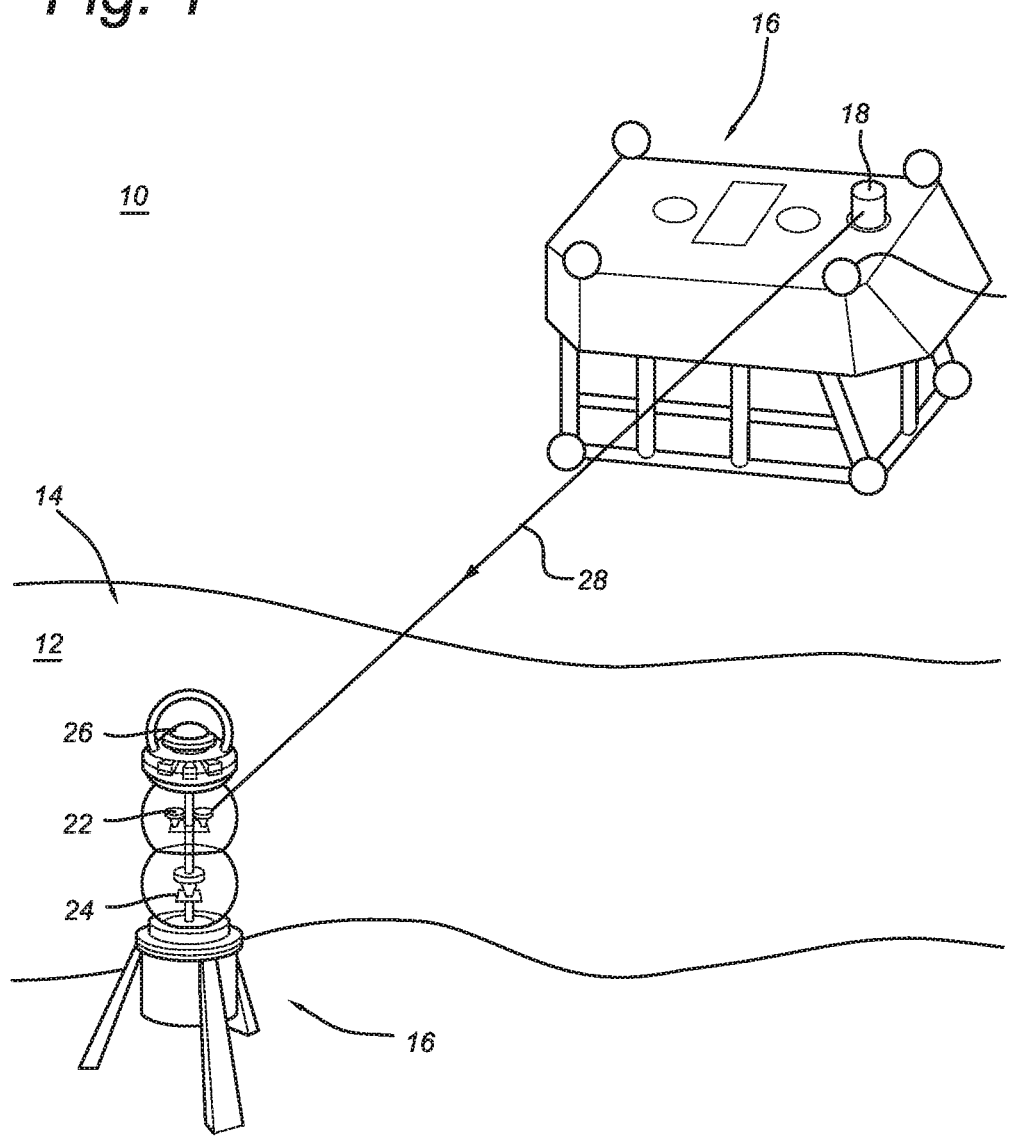
FIG. 1 schematically shows a unit with a receiver according to an embodiment.

FIG. 1 schematically shows an embodiment of a monitoring unit 20 deployed underwater. The unit 20 is immersed in a body of seawater 10, and is positioned on a surface 14 that forms a water-soil interface between the seawater 10 and the seabed 12 below. Such a unit 20 may also be placed on man-made submerged structures in/on the seabed 12, for instance on wellheads and production manifolds that form part of a subsea oil extraction system, and may cooperate with similar units (not shown) that are deployed in the vicinity.

The unit 20 includes a photogrammetric camera 26 enclosed within a rigid transparent dome on a top side of the unit. A medial part of the housing of the unit 20 is also made of rigid and optically transparent material, and accommodates an optical communication receiver 22 and an optical communication transmitter 24. In this example, the optical receiver 22 and transmitter 24 are configured to communicate via wireless light signals having wavelengths substantially in an optical range of 300 nanometers to 600 nanometers because optical signals with such wavelengths are best transmitted through seawater. They are amplitude-modulated at a frequency of, for instance, 800 kHz to represent the central carrier frequency, and further modulated around this carrier frequency to convey data, e.g. by on/off key modulation. Other modulation frequencies than 800 kHz can be chosen if desired.

In an initial deployment stage for the system, the unit 20 is placed on the seabed 12, for instance by an underwater vehicle. To conserve electrical power, the deployed unit 20 remains in a dormant state for extended times, but may be woken up by an underwater vehicle 16 entering the deployment site. FIG. 1 illustrates an exemplary ROV 16, but this may also be a different type of vehicle e.g. an autonomous underwater vehicle (UAV). The ROV 16 may include a wireless optical communication device with an optical transmitter 18, which is configured to communicate with the unit 20. The ROV 16 may move within communication range of the unit 20 and emit an appropriate optical signal 28 towards the unit 20, to cause the unit 20 to transition from the dormant state into an operative state. Once activated, the unit 20 may be requested via optical transmission by the ROV 16 to execute various monitoring and/or data acquisition functions. The unit 20 may for instance be ordered to acquire images using its camera 26, and may be ordered to transmit acquired data to the ROV 16 or to other observation units within range using its signal transmitter 24.

Figure 2:
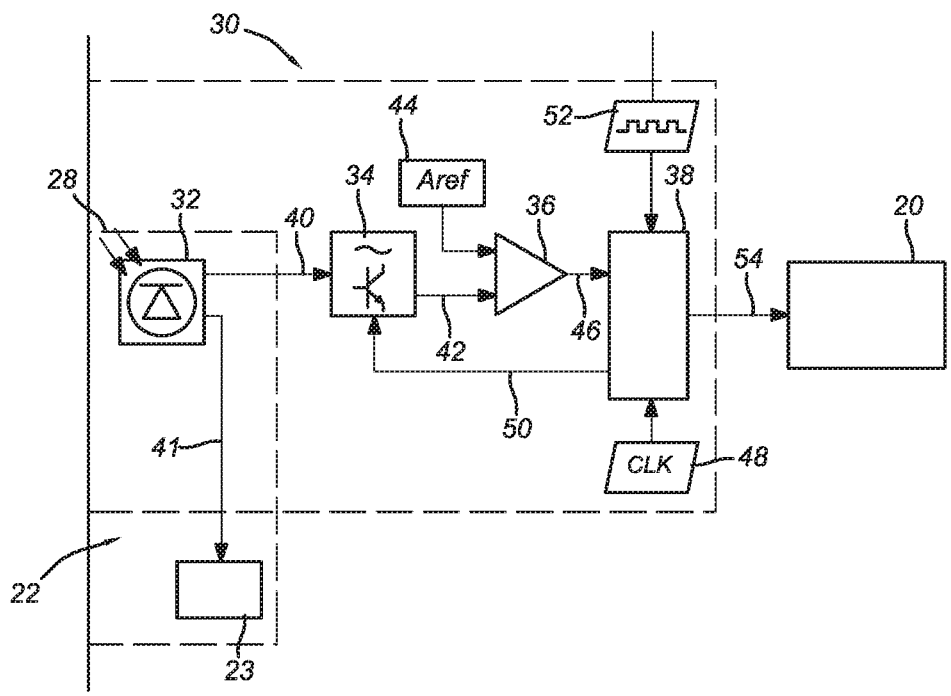
FIGS. 2 and 3 present schematic views of receivers according to embodiments.

FIG. 2 shows an embodiment of a receiver 30, which is integrated with the optical receiver 22, and is connected to a sensor 32 that is used for reception of optical communication signals 28. In this example, the sensor 32 is a SiPM sensor, which includes an array of reverse biased avalanche photodiode (APD) elements that are connected in parallel between a common cathode and a common anode of a sensor frontend circuit 23. Sensor 32 produces an output signal 40 in response to the received optical signals 28. The receiver 30 is configured to generate an activation signal 54 in response to a predetermined pattern in the output signal 40 generated by the sensor 32. This activation signal 54 causes the unit 20, shown in FIG. 1, to transition from a dormant state in which the communication receiver 22, the communication transmitter 24, and the camera 26 are deactivated, to an operative state in which these components 22-26 are energized and functional.

Receiver 30 has low power requirements, and comprises, in this example, a super regenerative oscillator (SRO) circuit 34, a comparator 36, and a microcontroller 38. In this example, the SRO circuit 34 may be formed by a circuit comprising a single transistor with a power consumption in the milliwatt range.

In general, SRO 34 is a super regenerative oscillator comprising a frequency selective element and a gain element. The frequency selective element may be implemented using any circuit that is commonly used in constructing oscillators like LC tank circuits, RC delay circuits, quartz crystals, delay-lines, ceramic resonator, SAW filters, etc. The frequency selective element is tuned to the carrier frequency, e.g. 800 kHz, of the optical communication signals. The gain element may be implement using any amplifier like BJT transistors, FET transistors, operational amplifiers, tunnel diodes, etc. The gain of the gain element is controlled by a driving signal 50.

Figure 5:
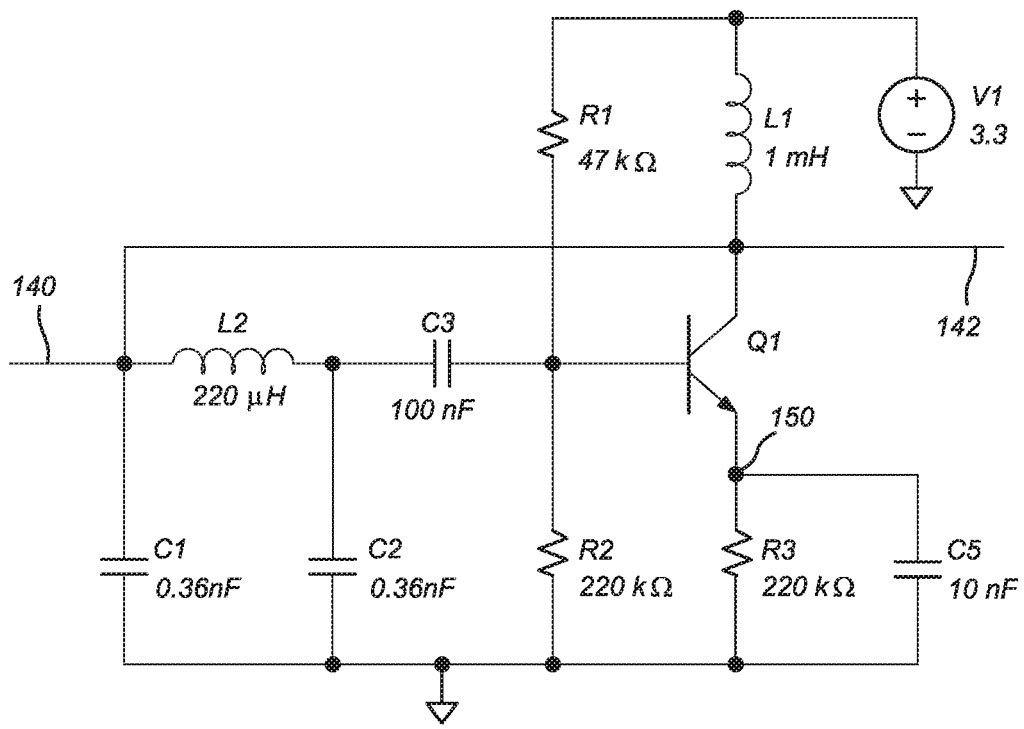
FIG. 5 shows an example of a SRO circuit.

The preferred embodiment is a single transistor oscillator, as shown in FIG. 5. Common oscillator designs, such as Colpitts, Hartley, Pierce, Clapp or any other oscillator types, can be used in the embodiments of the invention. However, other low power devices, such as low power microcontrollers or integrated circuits can also be used as oscillator.

The SiPM sensor 32 is configured to receive wireless optical signals 28 from an external light source in the vicinity of the unit 20, e.g. from ROV transmitter 18 or a transmitter of a nearby unit.

The SRO circuit 34 is electrically coupled to the sensor 32, to receive or sample the detector output signal 40. The SRO 34 is configured to electrically oscillate at a substantially constant SRO resonance frequency but with a changing SRO amplitude As. The oscillation forms an output signal 42 of the SRO 34. When the sensor 32 receives an optical signal 28 with a carrier frequency that substantially matches the SRO oscillation frequency, e.g. 800 kHz, the oscillating detector signal 40 will cause the oscillatory behavior of the SRO 34 to change.

The comparator 36 is electrically coupled to the SRO 34 and to a source 44 that supplies a signal, e.g. voltage, with a reference amplitude Aref, which is used as a threshold value. The comparator 36 functions as an envelope detector, which receives the SRO output 42, measures the oscillation amplitude As in the SRO output 42, and compares the oscillation amplitude As with the reference signal amplitude Aref. The comparator 36 generates a distinct comparator output signal 46 in response to detecting that the oscillation amplitude As has reached the threshold value Aref.

The microcontroller 38 is electrically coupled to the comparator 36, to allow comparator signal 46 to be fed to the microcontroller 38. During operation, the microcontroller 38 detects and tracks transitions in the comparator signal 46, and determines delay times Ti between consecutive transitions. The microcontroller 38 monitors a sequence of transitions in the comparator signal 46 in consecutive time intervals Δti, determines a sequence of delay times Ti associated with each interval Δti, and repetitively compares the most recent sequence of transitions in the comparator signal 46 (or delay times Ti) to a reference sequence signal 52 of which the variation in time resembles a predetermined code.

When the microcontroller 38 establishes that a sequence of times Ti in the comparator signal 46 matches the reference sequence signal 52 according to a predetermined metric, the microcontroller 38 generates and dispatches an activation signal 54 to the unit 20, e.g., to one or more of optical receiver 22 (23), optical transmitter 24, and camera 26, thereby causing the unit 20 to transition from its dormant state into its operative state. So, the reference sequence signal 52 functions as a wake-up code check signal.

In the example of FIG. 2, the microcontroller 38 is also electrically coupled to the SRO 34 and configured to generate and impose onto the SRO 34 the driving signal 50 that is superimposed upon the detector signal 40. This driving signal 50 is periodic and subdivided into time slots Δti of identical lengths, by means of a clock signal 48 furnished to the microcontroller 38. This driving signal 50 helps to quench and induce electrical oscillation of the SRO 34 in each time slot Δti in a periodically paced manner.

Alternatively, the driving signal 50, which functions as a quench ramp signal, can be generated by and supplied to the SRO 34 by a separate dedicated circuit, not shown, outside of microcontroller 38. Such a dedicated circuit can be a simple digital or analogue circuit.

Figure 3:
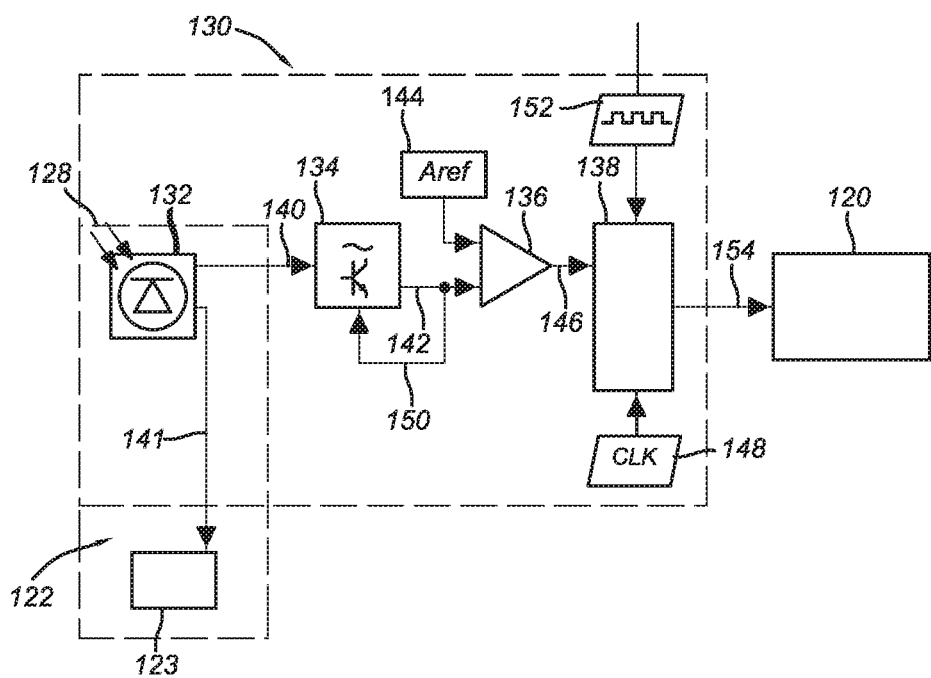

As a further alternative, a "self-quenched" architecture can be employed, in which the SRO 134 itself generates its own quench signal. This is shown in FIG. 3 where the output signal 142 is fed back to SRO circuit 134 as drive signal 150 and used as a self-quenching signal. For the rest, FIG. 3 shows the same circuit as FIG. 2, with like features designated by similar reference numerals preceded by 100 to distinguish the embodiments.

When the system is in use, optical transmitter 18 (FIG. 1), if it desires to transmit a logic "1" level, transmits a light signal which is rapidly switched on and off at the above mentioned carrier frequency of e.g. 800 kHz. When the optical transmitter 18 desires to transmit a "0", it is configured such that its light source remains off.

The carrier frequency can be in the range of 10 Hz to 1 GHz. A single bit in the code word contains multiple on/off sequences of the carrier. The bit rate, measured in bits per second is thus lower than the carrier frequency and in the range of almost 0 bps to 100 Mbps The preferred embodiment uses a carrier frequency of 800 kHz and a bit rate of 10 bps.

Figure 4:
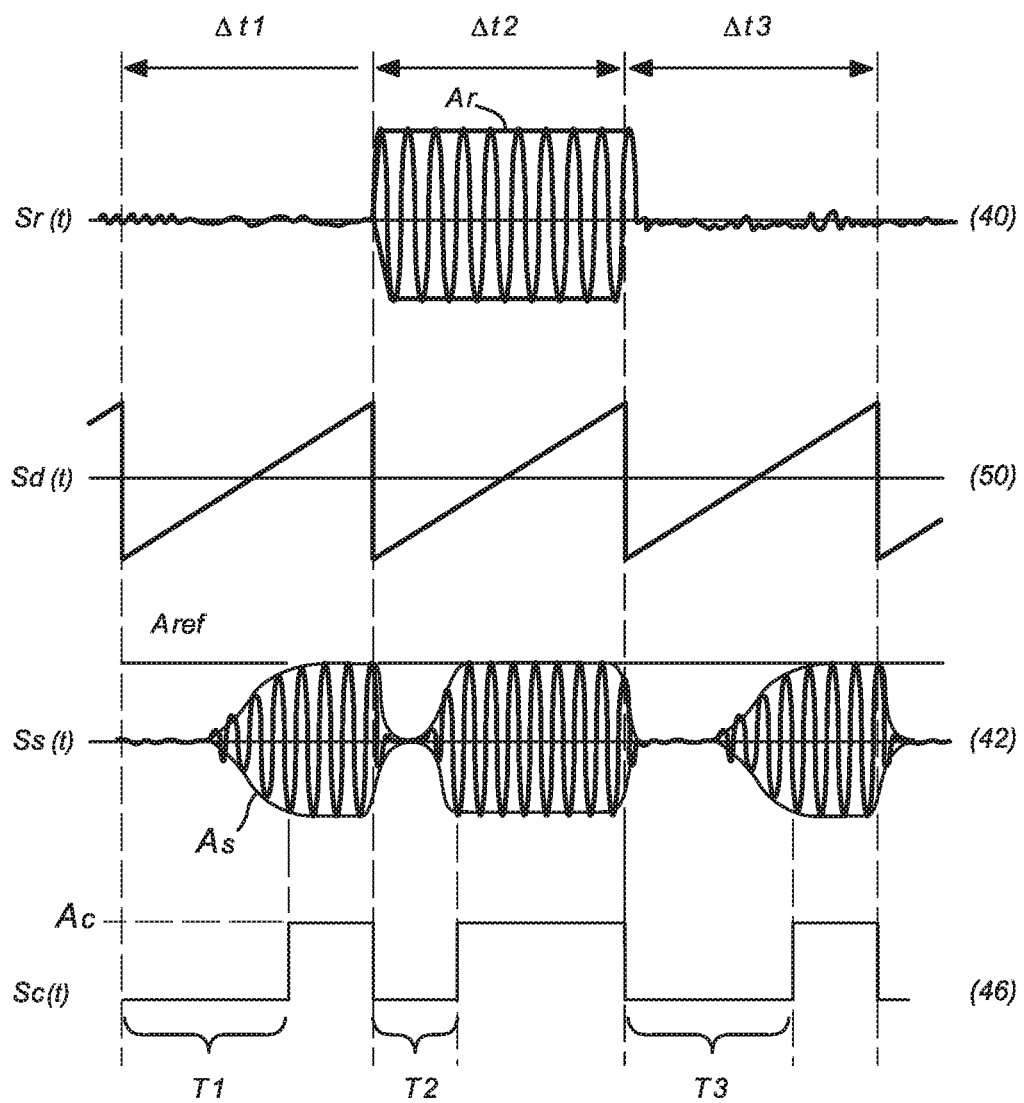
FIG. 4 schematically illustrates signal waveforms for various components in an operational underwater unit.

FIG. 4 illustrates typical signal waveforms as a function of time, which are associated with the operation of the receiver, for instance the exemplary receiver 30 illustrated in FIG. 2. The first waveform Sr represents a time sample of the detector current 40 over three consecutive time slots Δti (i=1, 2, 3). Waveform Sr as shown in FIG. 4 comprises a first time slot Δt1 in which no signal is present, a second time slot Δt2 in which a signal is present oscillating with the above mentioned carrier frequency, and time slot Δt3 in which no signal is present. Thus, a code word "010" has been received by sensor 32. As can be seen, each time slot Δti is used for transmitting one bit and the bit rate is lower than the carrier frequency.

The second waveform Sd in FIG. 4 represents a synchronous time sample of an example of the driving signal 50 generated by the microcontroller 38. The driving signal 50 controls the gain of SRO 34. In this example, the second waveform Sd is formed as a periodic sawtooth signal, wherein the periods coincide with the time slots Δti and in which each period is formed by a steeply falling edge that quenches SRO oscillations and a slowly rising edge that induces SRO oscillations.

The third waveform Ss represents a synchronous sample of oscillating output signal 42 of the SRO 34, for which the SRO oscillation amplitude envelope As is also indicated. The driving signal 50 from microcontroller 38 alternatingly induces and quenches oscillations in the SRO 34. As the driving signal 50 slowly ramps up, the oscillating output signal 42 also starts to build up.

The fourth waveform Sc represents a synchronous sample of the comparator output signal 46. This output signal 46 is formed by the comparator 36, via comparison of the oscillation amplitude As of output signal 42 with reference signal amplitude Aref. A time delay required for the oscillation signal amplitude As to rise from (virtually) zero to the reference signal amplitude Aref will vary, depending on the amplitude Ar of the detector current 40, and may be described by a characteristic time Ti for each time slot Δti. If the sensor 32 is not receiving any optical signal (as in slots Δt1 and Δt3) and thus does not generate a substantial current 40, it takes the SRO 34 a characteristic time T1 or T3 (T1=T3) to bring the SRO oscillation signal amplitude As to the reference level Aref. If the sensor 32 does detect an optical signal 28, it takes the SRO 34 a second characteristic time T2 shorter than each of the times T1, T3 to bring the oscillation amplitude As to the reference level Aref. In other words, the time it takes for the oscillations to exceed reference level Aref is influenced by the carrier amplitude of detector signal 40. The greater the carrier amplitude of detector signal 40, the faster the amplitude of the oscillations of the SRO output will reach reference level Aref.

As the driving signal 50 falls to its lowest levels, the oscillations in SRO 34 are stopped or "quenched". Because of the periodicity of control signal 50 the oscillations in SRO 34 are thus periodically started and quenched.

The frequency of driving signal 50 should be less than the carrier frequency. A person skilled in the art would recognize that the time it takes for the oscillations in the SRO output signal 42 to build up is also dependent on the quality factor Q of the frequency selected element inside the SRO 34. The higher the Q the slower the buildup of oscillations in the SRO output signal 42. The frequency of the driving signal 50 must thus be tuned to the Q of the frequency selective element in SRO 34. At the same time, the frequency of the driving signal 50 must be at least equal or preferably higher than the bit rate in order to satisfy the Nyquist criteria for alias-free sampling.

In an example, the driving signal has a frequency in a range of 750-2500 Hz, preferably in a range of 1000-2000 Hz, e.g. 1500 Hz.

A person skilled in the art would thus understand that the frequency selectivity of the SRO circuit, the maximum bit rate and the carrier frequency are all related. The optimum SRO circuit is thus a compromise between all these parameters.

The SRO circuit thus converts carrier amplitude variations in the detector signal 40 into pulse-width variations in comparator signals 46.

Processing device 38 receives a clock signal from clock 48 and measures the pulse-width variations in the comparator output signal 46 by counting the number of clock pulses in the clock signal between the rising and falling edges of the comparator signal 46, cf. signal Sc in FIG. 4.

The pulse-width variations of the comparator signals 46 form in time the received code word. This code word is compared by processing device 38 against the reference code word 52. When the received code word and the reference code match, the processing device 38 generates activation signal 54 and device 20 is woken up.

So, the characteristic time Ti depends on the amplitude Ar and frequency of the detector current 40. In this manner, an increased intensity of received light signal is transformed into a shortened characteristic time Ti.

FIG. 5 shows an example of a SRO circuit 134. The SRO circuit 134 shown in FIG. 5 is a Colpitts oscillator. The SRO circuit 134 comprises a capacitor C1 connected between an input terminal and ground and an inductor L2 connected with a first terminal to the input terminal and with a second terminal to a first terminal of a capacitor C2 of which its second terminal is connected to ground. A capacitor C3 has a first terminal connected to the first terminal of capacitor C2 and its second terminal connected to a first terminal of a resistor R2. A second terminal of resistor R2 is connected to ground. First terminal of resistor R2 is connected to a base of a transistor Q1. A resistor R1 has a first terminal connected to a power supply V1 and a second terminal connected to the base of transistor Q1. An inductor L1 has a first terminal connector to the power supply V1 and a second terminal connected to a collector of the transistor Q1. The collector of transistor Q1 is fed back to the input of the SRO circuit. Transistor Q1 has an emitter connected to a first terminal of a resistor R3 and a first terminal of a capacitor C5. A second terminal of resistor R3 and a second terminal of capacitor C5 are both connected to ground.

The input terminal of SRO 134 is configured to receive output signal 140 of sensor 132. The collector of transistor Q1 is configured to provide output signal 142. Transistor Q1 is also an amplifier wherein the base is the input of the amplifier and the collector is the output of the amplifier. Transistor Q1 is thus operated in the common emitter configuration. L2, C1 and C2 form a frequency selective circuit that feeds the output signal of the amplifier into the input of the amplifier thereby forming a complete oscillator. The output signal 142 causes varying currents through the transistor Q1 which are integrated by C5. When oscillations increase, the current through Q1 increases and the voltage over C5 increases. At some point the voltage over C5 becomes so large that voltage difference between the base and emitter of Q1 becomes so small that transistor Q1 stops conducting and the oscillations are thus quenched. When the oscillations 142 have stopped, C5 is discharged through R3 causing the transistor Q1 to slowly turn on again hence creating a slow ramp up of the gain of Q1. This Colpitts oscillator is of the self-quenching type and can, thus, be used in the setup of FIG. 3.

Figure 6:
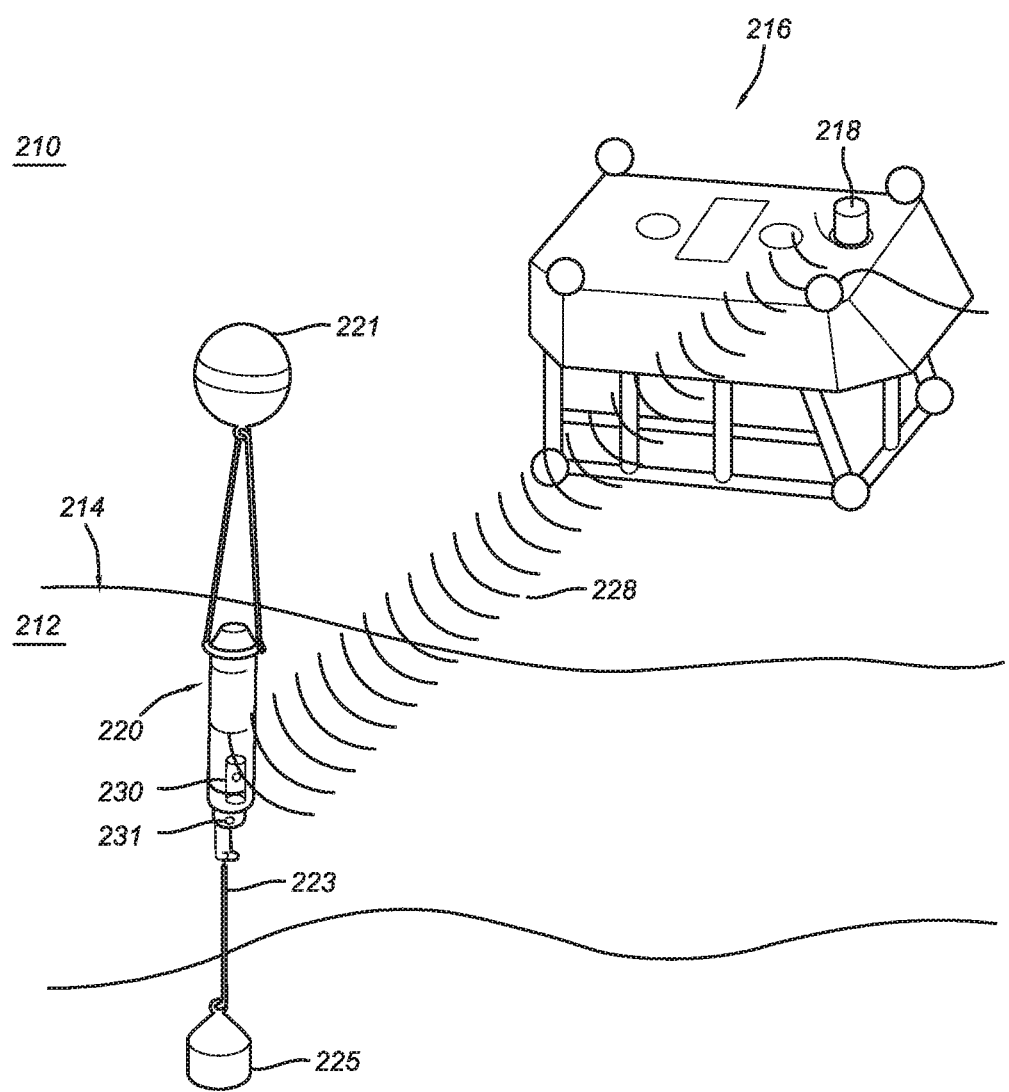
FIG. 6 schematically shows a unit with a receiver according to another embodiment.

FIG. 6 schematically shows a unit 220 with a receiver 230 according to another embodiment. Features in the unit 220 that have already been described above with reference to the previous unit embodiments (and in particular FIGS. 1-5) may also be present in the unit 220 in FIG. 6, and will not all be discussed here again. Like features are designated with similar reference numerals preceded by 200 to distinguish the embodiments.

This exemplary unit 220 includes various monitoring sensors (not shown) that are enclosed within a rigid cylindrical housing, which is suspended upright in the seawater 210 near the seafloor 212 by means of a floating body 221 connected to an upper end of the housing. On a lower side of the housing, the unit 220 is held close to the seafloor 212 by means of a cable 223 and a weight 225. The unit 220 comprises a mechanical release 231 that temporarily maintains a connection with the cable 223. In this case, the sensor 232 is an acoustic sensor that is coupled to the mechanical release 231. The receiver 230 is configured to detect an incoming acoustic signal 228 with an appropriate carrier wave frequency and temporal characteristic from an external source 218 (e.g. and acoustic transmitter 218 from a nearby ROV 216), in a similar manner as described above with reference to FIGS. 2-4. The receiver 230 responds to such a signal 228 by providing an activation signal 254 to the mechanical release 231, which energizes the release mechanism and removes the temporal connection, thus allowing the unit 220 to ascent from the seafloor to the surface of 210 while leaving the cable 223 and weight 225 behind on the seafloor 212.

The receivers 30 as described above have the following advantages:

The receiver consumes only very little power. This especially so, when the SRO is implemented with a single transistor.

In case of implementation with a single transistor, the receiver is very simple and is thus more reliable and easier to design and implement.

The receiver is frequency selective, i.e, it only responds to a received signal of a predetermined frequency.

The receiver has a high gain, so amplifies weak signals.

The receiver has a high dynamic range and is, thus, able to receive strong signals (or receive weak signals in the presence of unwanted strong signals).

The present invention may be embodied in other specific forms without departing from its essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

For instance, the examples described herein above, the receiver with sensor and super regenerative oscillator formed part of power-constrained units. Those of skill in the art will understand that the proposed receiver with sensor and super regenerative oscillator may be included in systems that are not power-constrained, but which are for instance supplied with mains electric power.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a Programmable System on Chip (PSoC), a field programmable gate array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A processor may also be implemented as a combination of computing devices. The steps of a method or algorithm described in connection with the embodiments disclosed herein may be embodied directly in hardware, in a software module executed by a processor, or in a combination of the two.

LIST OF REFERENCE SYMBOLS

Similar reference numbers that have been used in the description to indicate similar elements (but differing only in the hundreds) have been omitted from the list below and in the claims, but should be considered implicitly included.

10 body of water (e.g. seawater)
12 submerged earth layer (e.g. seabed)
14 submerged earth surface 16 underwater vehicle (e.g. ROV or UAV)
18 vehicle transmitter
20 unit (e.g. underwater observation or communication unit)
22 communication receiver
23 receiver frontend
24 communication transmitter
26 imaging device (e.g. underwater photogrammetric camera)
28 wireless signal (e.g. from underwater vehicle)
30 receiver or wake-up receiver
32 sensor (e.g. light/acoustic/magnetic sensor)
34 SRO circuit
36 envelope detector (e.g. comparator)
38 microcontroller
40 detector signal
41 further detector signal
42 SRO output signal
44 reference amplitude source
46 comparator output signal
48 clock signal
50 driving signal
52 reference pattern
54 activation signal
221 float
223 cable
225 weight
231 mechanical release
Ar detector signal amplitude
Aref reference amplitude
Ac comparator signal amplitude
As SRO oscillation amplitude
Sr detector signal waveform
Sd driving signal waveform
Ss SRO signal waveform
Sc comparator output waveform
$\Delta t_i$ SRO oscillation interval ($i \in N$)
Ti characteristic time in interval $\Delta t_i$

The invention claimed is:

1. A receiver configured to provide an activation signal to a device in order to transition the device from a dormant state to an operative state, wherein the receiver comprises:
a sensor, being one of an optical sensor, an acoustic sensor, and a magnetic field sensor, wherein the sensor is configured to receive a wireless signal from an external source and to generate a detector signal in response to the received wireless signal;
a super regenerative oscillator (SRO) circuit, electrically coupled to the sensor to receive the detector signal, and configured to electrically oscillate with a constant SRO frequency and with a SRO amplitude that changes when a carrier frequency of the detector signal substantially matches the SRO frequency, and
a processing device, configured to monitor the SRO amplitude in time, and to generate the activation signal when a temporal characteristic of the monitored SRO amplitude matches a predetermined reference pattern.

2. The receiver according to claim 1, wherein the SRO circuit is configured to electrically oscillate with a varying SRO amplitude during successive time intervals, wherein the SRO amplitude quenches at a start of each time interval, and subsequently rises during said time interval, wherein a rising rate for the SRO amplitude within said time interval is magnified when the carrier frequency of the detector signal substantially matches the SRO frequency, and wherein the processing device is configured to determine characteristic times for the rise of the SRO amplitude during each of the time intervals to derive the temporal characteristic.

3. The receiver according to claim 2, wherein the processing device comprises a comparator that is configured to receive an output signal with said varying SRO amplitude from the SRO circuit, and is configured to output a comparator signal with a distinct value if the varying SRO amplitude exceeds a reference amplitude.

4. The receiver according to claim 3, further comprising a microcontroller that is electrically coupled to the comparator and configured to:
receive and store said comparator signal with a sequence of consecutive distinct values in time;
compare the sequence of consecutive distinct values to said predetermined reference pattern, and
generate the activation signal when the sequence of consecutive distinct values matches said predetermined reference pattern.

5. The receiver according to claim 4, wherein the microcontroller is electrically coupled to the SRO circuit, and configured to generate and impose onto the SRO circuit a driving signal that is superimposed upon the detector signal.

6. The receiver according to claim 5, wherein the driving signal forms an alternatingly rising and falling signal that is configured to periodically induce and quench oscillations in the SRO circuit, wherein the driving signal may for instance be a quench-ramp signal with a sawtooth profile.

7. The receiver according to claim 6, wherein the sensor is an optical sensor including a plurality of avalanche photodiode, APD, elements, wherein the APD elements may for instance be arranged into an array to form a silicon photomultiplier, SiPM, sensor.

8. The receiver according to claim 1, wherein the SRO circuit comprises a frequency selective element and a gain element, which frequency selective element is tuned to said carrier frequency.

9. The receiver according to claim 8, wherein a gain of the gain element is controlled by said driving signal.

10. The receiver according to claim 1, wherein said SRO circuit is at least one of a Collpits, Hartley, Pierce, and Clapp oscillator.

11. The receiver according to claim 1, wherein the receiver is a wake-up receiver.

12. A unit comprising a receiver according to claim 1, wherein the processing device is configured to generate an activation signal to transition the unit from a dormant state to an operative state.

13. The unit according to claim 12, comprising at least one of a wireless communication device and an imaging device, wherein the processing device is configured to generate the activation signal to transition the at least one of the wireless communication device and the imaging device from a dormant state to an operative state.

14. The unit according to claim 13, wherein the wireless communication device includes a communication receiver that is electrically coupled to the sensor of the receiver, and is configured to receive and process further detector signals from the sensor when the communication device has transitioned into the operative state.

15. The unit according to claim 13, wherein the unit is configured to be deployed underwater on or in a submerged earth layer or a submerged structure, wherein the imaging device is an underwater photogrammetric camera for acquiring image data of the surroundings of the unit, and/or wherein the communication receiver is an optical receiver configured to receive wireless optical communication signals that approach the unit through the surrounding fluid medium.

16. The unit according to claim 12, wherein the unit is configured to be deployed underwater on or in a submerged earth layer or a submerged structure, wherein the unit comprises an mechanical release that is configured to create a temporal connection for holding the unit at or near the earth layer or structure, wherein the sensor is coupled to the receiver and the receiver is configured to provide the activation signal to the mechanical release to remove the temporal connection and allow the unit to ascent from the earth layer or structure.

17. A method for transitioning a unit from a dormant state to an operative state, wherein the unit comprises a sensor that is one of an optical sensor, an acoustic sensor, and a magnetic field sensor, a super regenerative oscillator (SRO), circuit, and a processing device, wherein the method comprises:
receiving, with the sensor, a wireless signal from an external source in the vicinity of the unit;
generating, with the sensor, a detector signal in response to the received wireless signal;
receiving, with the SRO circuit, the detector signal;
causing the SRO circuit to electrically oscillate with a constant SRO frequency and with a SRO amplitude that changes when a carrier frequency of the detector signal substantially matches the SRO frequency;
monitoring, with the processing device, the SRO amplitude in time;
generating, with the processing device, an activation signal when a temporal characteristic of the monitored SRO amplitude matches a predetermined reference pattern, and
using the activation signal to transition the unit from the dormant state to the operative state.

18. The method according to claim 17, comprising:
causing the SRO circuit to electrically oscillate with a varying SRO amplitude during successive time intervals, including quenching the SRO amplitude at a start of each time interval, followed by causing the SRO amplitude to rise during said time interval, wherein a rising rate for the SRO amplitude within said time interval is magnified when the carrier frequency of the detector signal substantially matches the SRO frequency;

determining, with the processing device, characteristic times for the rise of the SRO amplitude during each of the time intervals, to derive the temporal characteristic.

19. The method according to claim 18, further comprising comparing the SRO amplitude with a reference amplitude, and generating a comparator signal with a distinct value if the SRO amplitude exceeds the reference amplitude.

20. The method according to claim 19, further comprising:
receiving and storing said comparator signal with a sequence of consecutive distinct values in time;
comparing the sequence of consecutive distinct values to said predetermined reference pattern, and
generating the activation signal when sequence of consecutive distinct values matches said predetermined reference pattern.

21. The method according to claim 17, wherein the microcontroller is electrically coupled to the SRO circuit, and wherein the method comprises:
generating, with the microcontroller, a driving signal, and
imposing the driving signal together with the detector signal onto the SRO circuit.

22. The method according to claim 21, wherein the driving signal is a periodically rising and falling signal, and wherein the method comprises:
periodically quenching and inducing oscillations in the SRO circuit during each of successive time intervals.

23. A non-transitory computer readable medium, storing instructions that, when executed by a processor, will cause the processor to:
receiving, with a sensor, a wireless signal from an external source in a vicinity of a unit;
generating, with the sensor, a detector signal in response to the received wireless signal;
receiving, with a super regenerative oscillator (SRO) circuit, the detector signal;
causing the SRO circuit to electrically oscillate with a constant SRO frequency and with a SRO amplitude that changes when a carrier frequency of the detector signal substantially matches the SRO frequency;
monitoring, with the processor, the SRO amplitude in time;
generating, with the processor, an activation signal when a temporal characteristic of the monitored SRO amplitude matches a predetermined reference pattern, and
using the activation signal to transition the unit from a dormant state to an operative state.

* * * * *